United States Patent
Nakamura et al.

(10) Patent No.: US 10,009,059 B2
(45) Date of Patent: Jun. 26, 2018

(54) HIGH FREQUENCY MODULE

(71) Applicant: Murata Manufacturing Co., Ltd., Kyoto (JP)

(72) Inventors: Hayato Nakamura, Kyoto (JP); Eigo Tange, Kyoto (JP); Tadashi Matsuoka, Kyoto (JP); Yasushi Shigeno, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 15 days.

(21) Appl. No.: 15/198,214

(22) Filed: Jun. 30, 2016

(65) Prior Publication Data

US 2016/0308575 A1    Oct. 20, 2016

Related U.S. Application Data

(62) Division of application No. 14/366,733, filed as application No. PCT/JP2012/082512 on Dec. 14, 2012, now Pat. No. 9,413,415.

(30) Foreign Application Priority Data

Dec. 20, 2011    (JP) .................................. 2011-278733

(51) Int. Cl.
  *H04B 1/44*    (2006.01)
  *H04W 72/04*    (2009.01)
  (Continued)

(52) U.S. Cl.
  CPC .............. *H04B 1/44* (2013.01); *H04B 1/006* (2013.01); *H04B 1/0064* (2013.01);
  (Continued)

(58) Field of Classification Search
  CPC combination set(s) only.
  See application file for complete search history.

(56) References Cited

U.S. PATENT DOCUMENTS 7,324,790 B2 * 1/2008 Hyunh .................. H04B 1/44
                                                              455/78
8,824,974 B2    9/2014 Nakajima et al.
(Continued)

FOREIGN PATENT DOCUMENTS

JP    2006-050590 A    2/2006
JP    2007-067762 A    3/2007
(Continued)

OTHER PUBLICATIONS

International Search Report issued in Application No. PCT/JP2012/082512 dated Jan. 29, 2013.
(Continued)

*Primary Examiner* — Nay A Maung
*Assistant Examiner* — Erica Fleming-Hall
(74) *Attorney, Agent, or Firm* — Pearne & Gordon LLP

(57) ABSTRACT

Provided is a high frequency module capable of reducing the IMD. During the transmission/reception operation based on W-CDMA, control signals VSWCC, VTRXCC are output as Hi signals from a control logic. Consequently, transistor T1 is turned ON, and transistors T2, T3 are respectively turned OFF. When the transistor T1 is turned ON, the voltage output from an operational amplifier is output as the signal VVSW to a control terminal, and the control signal VTRXC is output as a Hi signal. The signal VVSW is of a voltage level that is lower than that of the control signal VTRXC. The control signal VTRXC is a signal for turning ON a transistor circuit Q1, and the signal VVSW is a signal for supplying a DC voltage to the antenna potential. It is thereby possible to reduce the ON resistance of the transistor circuit Q1 and improve the IMD characteristics.

5 Claims, 11 Drawing Sheets

(51) Int. Cl.
  *H04B 1/00* (2006.01)
  *H04W 88/02* (2009.01)
(52) U.S. Cl.
  CPC ...... *H04B 1/0067* (2013.01); *H04W 72/0453* (2013.01); *H04W 88/02* (2013.01)

(56) References Cited

U.S. PATENT DOCUMENTS

| | | | | |
|---|---|---|---|---|
| 2004/0217914 A1* | 11/2004 | Yamashita | ........... | H04B 1/0057 343/850 |
| 2005/0048927 A1* | 3/2005 | Kemmochi | ............... | H01P 1/15 455/78 |
| 2005/0197095 A1* | 9/2005 | Nakamata | ........... | H04B 1/0057 455/403 |
| 2006/0001473 A1* | 1/2006 | Yasuda | ................ | H03K 17/693 327/415 |
| 2006/0003797 A1* | 1/2006 | Ogawa | ................ | H04B 7/0602 455/550.1 |
| 2006/0103485 A1* | 5/2006 | Okuyama | ................ | H01P 1/15 333/132 |
| 2007/0049352 A1* | 3/2007 | Nakajima | .............. | H04B 1/006 455/571 |
| 2008/0197923 A1* | 8/2008 | Nakajima | ................ | H03F 1/56 330/124 R |
| 2008/0212552 A1* | 9/2008 | Fukamachi | ........... | H04B 1/0057 370/343 |
| 2008/0317154 A1* | 12/2008 | Nakajima | ................ | H03K 17/005 375/267 |
| 2008/0318623 A1* | 12/2008 | Furutani | .............. | H04B 1/0057 455/553.1 |
| 2009/0075604 A1* | 3/2009 | Furutani | ................ | H04B 1/005 455/83 |
| 2009/0093270 A1* | 4/2009 | Block | ................... | H04B 1/006 455/552.1 |
| 2010/0069020 A1* | 3/2010 | Koya | ..................... | H04B 1/006 455/78 |
| 2010/0117713 A1 | 5/2010 | Katoh et al. | | |
| 2011/0260806 A1* | 10/2011 | Takeuchi | ................ | H03H 7/38 333/103 |
| 2012/0064952 A1* | 3/2012 | Iijima | ............... | H03K 17/6221 455/571 |
| 2012/0190312 A1* | 7/2012 | Voinigescu | .............. | H04B 1/44 455/78 |
| 2012/0252377 A1* | 10/2012 | Wachi | .................. | H03K 17/002 455/83 |
| 2013/0029614 A1* | 1/2013 | Cho | ........................ | H04B 1/48 455/83 |
| 2013/0271224 A1* | 10/2013 | Puliafico | ................ | H03F 3/19 330/296 |
| 2014/0328223 A1 | 11/2014 | Tange et al. | | |
| 2014/0370825 A1* | 12/2014 | Kim | ....................... | H01Q 5/328 455/77 |

FOREIGN PATENT DOCUMENTS

| | | |
|---|---|---|
| JP | 2008-011131 A | 1/2008 |
| JP | 2009-165077 A | 7/2009 |
| WO | 2009/066563 A1 | 5/2009 |

OTHER PUBLICATIONS

Written Opinion issued in Application No. PCT/JP2012/082512 dated Jan. 29, 2013.

* cited by examiner

|  | TRX mode | Standby | TX mode |
|---|---|---|---|
| VSWCO | High | Low | High |
| VTRXCO | High | Low | Low |

HIGH FREQUENCY MODULE

This is a division of U.S. Ser. No. 14/366,733 filed on Jun. 19, 2014 which is a continuation of International Application No. PCT/JP2012/082512 filed on Dec. 14, 2012 which claims priority from Japanese Patent Application No. 2011-278733 filed on Dec. 20, 2011. The contents of these applications are incorporated herein by reference in their entireties.

BACKGROUND

Field of the Invention

The present invention relates to a high frequency module, and particularly relates to technology that can be effectively applied to a high frequency module including an antenna switch to be mounted on a mobile communication device or the like.

Background

In recent years, a mobile phone system is adopting various types of communication systems such as the GSM (Global System for Mobile Communications) (registered trademark) system and the W-CDMA (Wideband Code Division Multiple Access) system for realizing a variety of services.

Moreover, the frequency bands used in the respective systems are also diverse, and, for example, with the GSM system, an 850 MHz band, a 900 MHz band, a 1800 MHz band, a 1900 MHz band and the like are used. Moreover, with the W-CDMA system, an 800 MHz band, a 900 MHz band, a 1500 MHz band, a 1700 MHz band, a 1900 MHz band, a 2100 MHz band and the like are used.

In order to use a mobile phone in all countries of the world, a portable terminal that is compatible with a plurality of frequency bands and a plurality of systems is used, and the trend is to use a so-called multi-mode multi-band terminal.

With this type of mobile phone, a high-performance antenna switch capable of switching a plurality of frequency signals is used, and such an antenna switch is undergoing high functionality through, for example, SP4T (Single pole 4 throw) and SP6T (Single pole 6 throw) pursuant to the adoption of multi-band modes and multi-modes.

Moreover, since the CDMA system is compatible with high-speed data communication and the like, the antenna switch is demanded of high IMD (InterModulation Distortion) characteristics (low distortion) in a broad bandwidth.

As technologies for improving the IMD characteristics in this type of antenna switch, there are, for example, a type in which a voltage conversion circuit is activated and applies an output voltage to the antenna switch when the transmission power value of the transmission signal is greater than or equal to a threshold in order to improve the intermodulation distortion of the antenna switch (refer to Patent Document 1), a type which adopts a configuration of interposing in series an individual switch circuit and a common external terminal selector switch circuit in the paths between the common external terminal and the respective input/output terminal groups provided for each frequency band (refer to Patent Document 2), among others.

Patent Document 1: Patent Publication JP-A-2006-50590
Patent Document 2: Patent Publication JP-A-2009-165077

However, a number of problems exist in these methods and apparatuses.

During communication using the GSM system, the antenna switch is switched such that the antenna switch and the transmission terminal are connected during transmission and the antenna switch and the reception terminal are connected during reception, but with the W-CDMA system, the transmission and the reception are conducted simultaneously.

Consequently, there is a problem in that the IMD characteristics of the antenna switch will deteriorate. IMD is a phenomenon that generates an output frequency component, which is a combination of the sum or difference of harmonics from reception signals of a frequency that differs from the transmission signals caused by the nonlinearity of the transistors configuring the antenna switch.

When a reception signal is received during transmission, an output frequency component is generated, which is a combination of the sum or difference of harmonics from reception signals of a frequency that differs from the transmission signals caused by the nonlinearity of the transistors configuring the antenna switch. As a result of this output, frequency component leaks to the receiver-side circuit via a duplexer or the like causing receiver sensitivity to deteriorate.

BRIEF SUMMARY

An object of this invention is to provide a high frequency module capable of reducing the IMD in an antenna switch.

The foregoing object and other objects and novel features of the present invention will become apparent from the descriptions of this specification and the appended drawings.

A brief description of the outline of the representative inventions disclosed herein is as follows.

According to one embodiment, a high frequency module includes an antenna switch including an antenna terminal connected to an antenna, a plurality of signal terminals corresponding to a plurality of communication systems, and a control terminal configured to supply, to the antenna terminal, a first control signal as a direct current voltage of an antenna potential, and configured to switch connection or non-connection between the plurality of signal terminals and the antenna terminal respectively, a logic unit configured to activate the antenna switch, and a voltage generation circuit configured to generate the first control signal and a second control signal, based on a control signal output from the logic unit.

Moreover, the antenna switch includes a transmission/reception transistor circuit configured to switch connection or non-connection between a transmission/reception signal terminal among the plurality of signal terminals and the antenna terminal, a transmission/reception signal being input/output to and from the transmission/reception signal terminal, and a transmission transistor circuit configured to switch connection or non-connection between a transmission signal terminal among the plurality of signal terminals and the antenna terminal, a transmission signal is input to the transmission signal terminal.

In addition, for the transmission/reception transistor circuit, the second control signal for turning ON or OFF the transmission/reception transistor circuit is input to a gate, the transmission/reception signal terminal is connected to one end of a source/drain, and the antenna terminal and the control terminal are connected to another end of the source/drain.

Moreover, the voltage generation circuit is configured to generate the first control signal to be provided to the control terminal and the second control signal for turning ON the transmission/reception transistor circuit based on the control signal output from the logic unit, and a voltage level of the second control signal is a voltage level that is higher than that of the first control signal.

A brief description of the effects yielded by the representative invention among the inventions disclosed herein is as follows.

(1) It is possible to reduce the IMD.

(2) Based on (1) above, it is possible to improve the receiver sensitivity in a mobile communication device.

DETAILED DESCRIPTION

Figure 1:
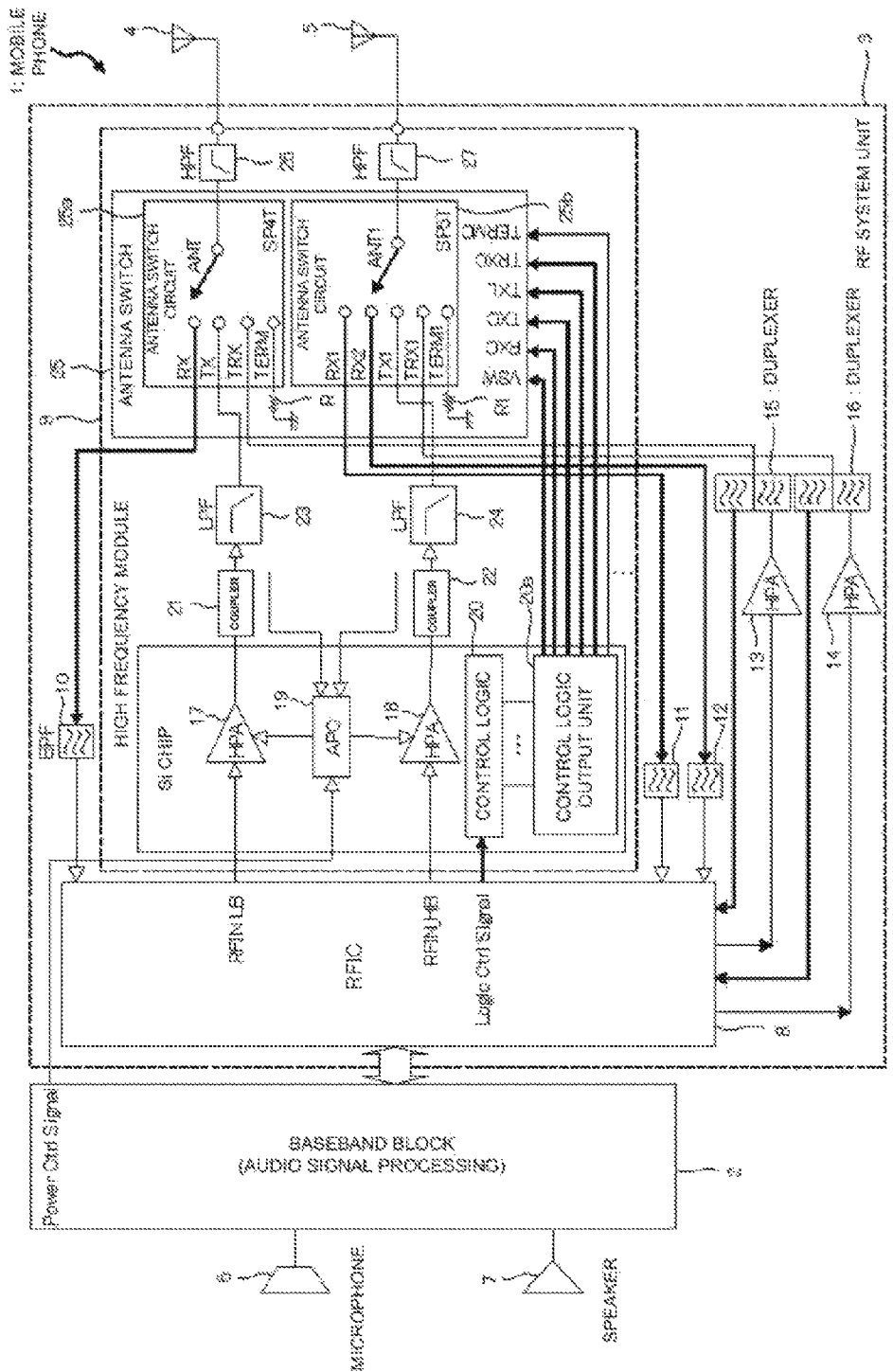
FIG. 1 is a block diagram showing an example of the configuration of the mobile phone according to embodiment 1 of the present invention.

Embodiments of the present invention are now explained in detail with reference to the drawings. Note that, as a general rule, the same reference numeral is given to the same member in all diagrams for explaining the embodiments, and the redundant explanation thereof is omitted.

(Embodiment 1)

<Outline of Invention>

The outline of this embodiment is as follows.

A high frequency module (high frequency module 9) includes antenna switches (antenna switch circuits 25a, 25b), a logic unit (control logic 20), and a voltage generation circuit (control voltage generation circuit 28).

The antenna switch includes antenna terminals (antenna terminals ANT, ANT1) connected to antennas (antennas 4, 5), a plurality of signal terminals (reception terminals RX, RX1, RX2, transmission terminals TX, TX1, transmission/reception terminals TRX, TRX1) corresponding to a plurality of communication systems, and a control terminal (control terminal VSW). The control terminal supplies, to the antenna terminals, a first control signal (signal VVSW) to become a direct current voltage of an antenna potential (VANT) and switches connection or non-connection between the plurality of signal terminals and the antenna terminals.

Moreover, a logic unit activates the antenna switches, and a voltage generation circuit generates the first control signal and a second control signal, respectively, based on control signals (control signals VSWCC, VTRXCC) output from the logic unit.

In addition, the antenna switch includes a transmission/reception transistor circuit (transistor circuit Q1) that switches connection or non-connection between the transmission/reception signal terminals (transmission/reception terminals TRX, TRX1) among the plurality of signal terminals to and from which a transmission/reception signal is input/output, and the antenna terminals, and a transmission transistor circuit (transistor circuit Q4) that switches connection or non-connection between the transmission signal terminals (transmission terminals TX, TX1) among the plurality of signal terminals to which a transmission signal is input, and the antenna terminals.

With the transmission/reception transistor circuit, the second control signal (control signal VTRXC) for turning ON or OFF the transmission/reception transistor circuit is input to a gate, the transmission/reception signal terminal is connected to one end of a source/drain, and the antenna terminal and the control terminal are connected to another end of the source/drain.

The voltage generation circuit generates the first control signal to be provided to the control terminal and the second control signal for turning ON the transmission/reception transistor circuit based on the control signal output from the logic unit, respectively, and a voltage level of the second control signal is a voltage level that is higher than that of the first control signal.

This embodiment is now explained in detail based on the outline described above.

<Configuration Example of Mobile Phone>

In this embodiment 1, a mobile phone 1 as one type of wireless communication system is configured, as shown in FIG. 1, comprises a baseband block 2, a Radio Frequency (RF) system unit 3, antennas 4, 5, a microphone 6, and a speaker 7.

The RF system unit 3, the microphone 6, and the speaker 7 are connected to the baseband block 2. The baseband block 2 performs audio signal processing. The RF system unit 3 includes an RFIC 8, a high frequency module 9, Band-Pass Filters (BPFs) 10 to 12, High-Power Amplifiers (HPAs) 13, 14, and duplexers 15, 16.

Moreover, the high frequency module 9 is configured from High-Power Amplifiers (HPAs) 17, 18, an Auto Power Control circuit (APC) 19, a control logic 20, a control logic output unit 20a, couplers 21, 22, Low Pass Filters (LPFs) 23, 24, an antenna switch 25, and High Pass Filters (HPFs) 26, 27.

The high frequency module 9 is configured from one package, and the high-power amplifiers 17, 18, the APC 19, the control logic 20, and the control logic output unit 20a are formed on one semiconductor chip (Si (silicon) chip), and the antenna switch 25 is formed on a different semiconductor chip.

Here, while a case where the high frequency module 9 is configured from one package is explained, the antenna switch 25 may also be formed on a different package in the high frequency module 9.

The antenna switch 25 includes an antenna switch circuit 25a of a so-called SP4T configuration and an antenna switch circuit 25b of a so-called SP5T configuration that perform switching to a plurality of terminals.

The antenna switch circuit 25a connects the reception terminal RX, the transmission terminal TX, or the transmission/reception terminal TRX to the antenna terminal ANT, to which the antenna 4 is connected via the HPF 26 for eliminating signals that are lower than a carrier. Moreover, the remaining terminals TERM of the antenna switch circuit 25a are connected to a ground (reference potential) via a resistor R.

Moreover, the antenna switch circuit 25b connects the reception terminals RX1, RX2, the transmission terminal TX1, or the transmission/reception terminal TRX1 to the antenna terminal ANT1, to which the antenna 5 is connected via the HPF 27 for eliminating signals that are lower than a carrier. The remaining terminals TERM1 of the antenna switch circuit 25b are connected to a ground (reference potential) via a resistor R1.

The determination of which terminal should be connected in the antenna switch circuits 25a, 25b is made by the control logic 20 performing selection control based on a control signal from the RFIC 8. The control logic output unit 20a outputs a control signal based on the control of the control logic 20.

A transmission signal of the GSM system that uses the 850 MHz band and the 900 MHz band is amplified by the high-power amplifier 17, and input to the transmission terminal TX via the coupler 21 that detects output signals, and the LPF 23 that eliminates signals that are higher than a carrier.

A transmission signal of the DCS system or the PCS system that uses the 1800 MHz band and the 1900 MHz band is amplified by the high-power amplifier 18, and input to the transmission terminal TX1 via the coupler 22 that detects output signals, and the LPF 24 that eliminates signals that are higher than a carrier.

Subsequently, these transmission signals are output via the antenna terminals ANT, ANT1 based on the selection from the control logic 20 and the control logic output unit 20a. Here, the APC 19 controls the output signal of the HPA 17 or the HPA 18 based on the control signal from the RFIC 8.

Moreover, as the reception signal that is input from the antenna terminal ANT to the reception terminal RX based on the selection of the control logic 20, a signal of a specific frequency (GSM: 850 MHz band, 900 MHz band) is selected by the band-pass filter 10, amplified by a Low Noise Amp (LNA) (not shown) provided to the RFIC 8, and output to the baseband block 2 and the like.

Similarly, as the reception signal that is input to the reception terminal RX1, a signal of a specific frequency (DCS: 1800 MHz band) is selected by the band-pass filter 11, amplified by a Low Noise Amp (LNA) (not shown) provided to the RFIC 8, and output to the baseband block 2 and the like.

As the reception signal that is input to the reception terminal RX2, a signal of a specific frequency (PCS: 1900 MHz band) is selected by the band-pass filter 12, amplified by the LNA (not shown) provided to the RFIC 8, and output to the baseband block 2 and the like.

A transmission signal of the W-CDMA system that uses the 900 MHz band is amplified by the high-power amplifier 13, classified as a transmission signal/reception signal by the duplexer 15, input to the transmission/reception terminal TRX, and output via the antenna terminal ANT based on the selection from the control logic 20.

Meanwhile, a reception signal that is input from the antenna terminal ANT to the transmission/reception terminal TRX is classified by the duplexer 15, amplified by the LNA (not shown) of the RFIC 8, and thereafter output to the baseband block 2 and the like.

Similarly, a transmission signal of the W-CDMA system that uses the 1900 MHz band is amplified by the high-power amplifier 14, classified as a transmission signal/reception signal by the duplexer 16, input to the transmission/reception terminal TRX1, and output via the antenna terminal ANT based on the selection from the control logic 20.

A reception signal that is input from the antenna terminal ANT to the transmission/reception terminal TRX1 is classified by the duplexer 16, amplified by the LNA (not shown) of the RFIC 8, and thereafter output to the baseband block 2 and the like.

<Configuration Example of Antenna Switch Circuit>

Figure 2:
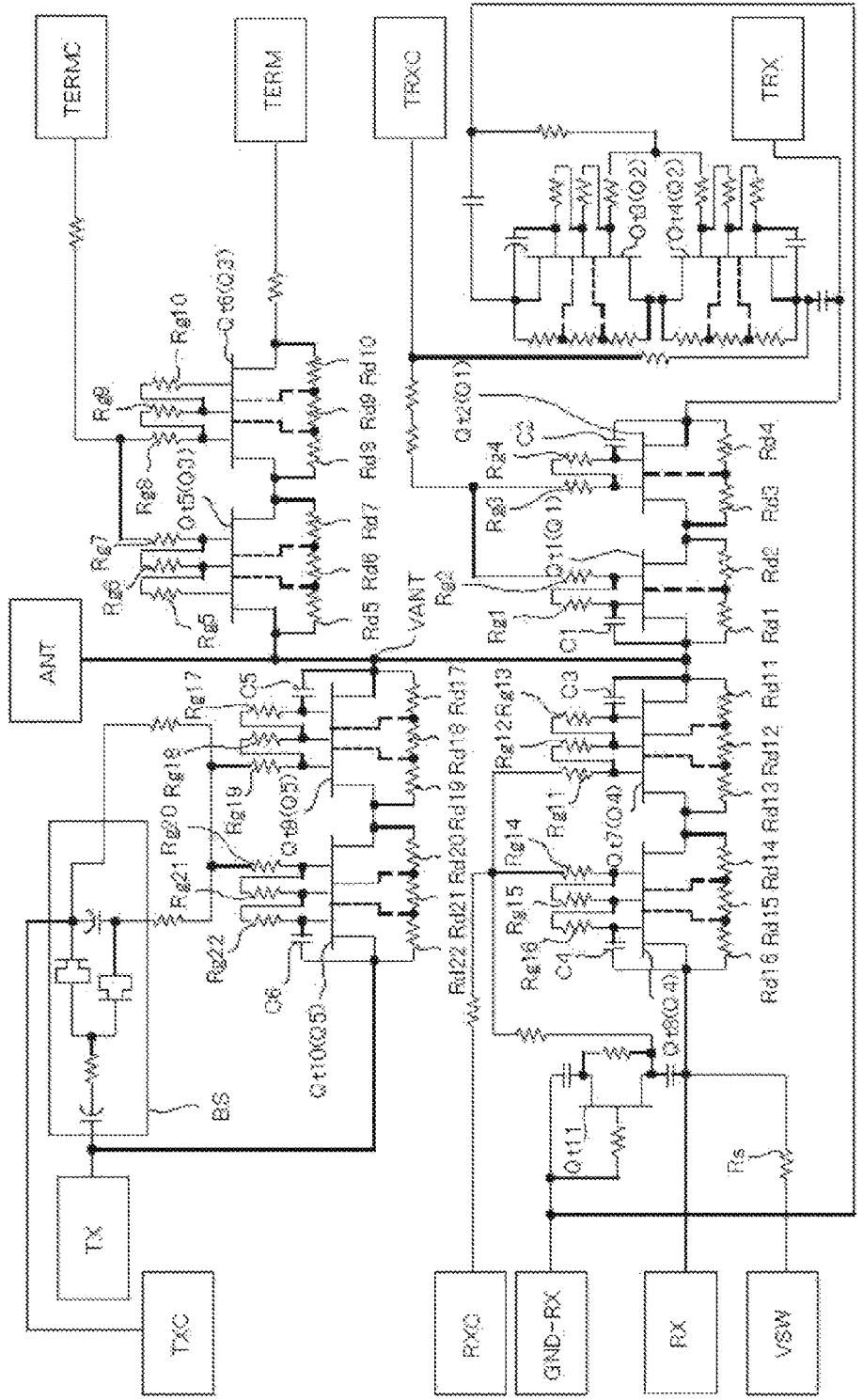
FIG. 2 is a circuit diagram showing an example of the configuration in the antenna switch circuit provided to the mobile phone depicted in FIG. 1.

FIG. 2 is a circuit diagram showing an example of the configuration in the antenna switch circuit 25a.

The antenna switch circuit 25a includes the transmission terminal TX for GSM transmission, the reception terminal RX for GSM reception, the antenna terminal ANT, and the transmission/reception terminal TRX for W-CDMA (900 MHz band) transmission/reception as described above.

A transistor circuit Q1 configured from two-stage connected dual gate transistors Qt1, Qt2 is connected between the antenna terminal ANT and the transmission/reception terminal TRX, and a transistor circuit Q2 configured from two-stage connected triple gate transistors Qt3, Qt4 is connected between the transmission/reception terminal TRX and the ground terminal GND-RX.

The transistors Qt3, Qt4 are configured from depression-type transistors. When the transmission/reception terminal TRXC is of a Lo signal (roughly 0 V) (transistors Qt1, Qt2 are OFF; that is, when transmission/reception based on W-CDMA is not being performed), the drain voltage and the gate voltage of the transistors Qt3, Qt4 become equal and cause the transistors Qt3, Qt4 to be turned ON, and lower the impedance of the nodes of the transmission/reception terminal TRX.

Moreover, when the control terminal TRXC is of a Hi signal (for instance, roughly 3.0 V) (transistors Qt1, Qt2 are ON; that is, when transmission/reception based on W-CDMA is being performed), the drain voltage becomes greater than the gate voltage and causes the transistors Qt3, Qt4 to be turned OFF.

A transistor circuit Q3 configured from two-stage connected triple gate transistors Qts, Qt6 is connected between the antenna terminal ANT and the terminal TERM, and a transistor circuit Q4 configured from two-stage connected triple gate transistors Qt7, Qt8 is connected between the antenna terminal ANT and the reception terminal RX.

Either ends of the source/drain of the transistor Qt11 are respectively connected between the connection node of the transistor Qt8 and the reception terminal RX, and the ground terminal GND-RX. In this transistor Qt11 also, when the control terminal RXC is of a Lo signal (roughly 0 V) (transistors Qt7, Qt8 are OFF), the drain voltage and the gate voltage of the transistor Qt11 become equal and cause the transistor Qt11 to be turned ON, and lower the impedance of the nodes of the reception terminal RX.

Moreover, a transistor circuit Q5 configured from two-stage connected triple gate transistors Qt9, Qt10 is connected between the antenna terminal ANT and the transmission terminal TX. The transmission terminal TX is connected to the gates of the transistors Qt9, Qt10 via a booster circuit BS.

As described above, provided to the respective signal terminals are the transistor circuits Q1, Q3 to Q5 for connecting to the antenna terminal ANT, and the transistor circuit Q2 and the transistor Qt11 for connecting to the ground.

Foremost, in the transistor Qt1, one end of the source/drain is connected to the antenna terminal ANT, one end of the source/drain of the transistor Qt2 is connected to the transmission/reception terminal TRX, and the other end of the transistor Qt1 and the other end of the transistor Qt2 are commonly connected.

One connecting unit of the resistor Rg1 and one connecting unit of the electrostatic capacitance element C1 are connected to one gate of the transistor Qt1, and the antenna terminals ANT are respectively connected to the other connecting unit of the electrostatic capacitance element C1.

One connecting unit of the resistor Rg2 and the other gate of the transistor Qt1 are respectively connected to the other connecting unit of the resistor Rg1, and the control terminal TRXC is connected to the other connecting unit of the resistor Rg2.

One connecting unit of the resistor Rg3 and one connecting unit of the resistor Rg4 are respectively connected to one gate of the transistor Qt2. The other connecting unit of the resistor Rg4 and one connecting unit of the electrostatic capacitance element C2 are connected to the other gate of the transistor Qt2, and the transmission/reception terminal TRX is connected to the other connecting unit of the electrostatic capacitance element C2.

Moreover, the resistors Rd1, Rd2 are connected in series between the one end and the other end of the source/drain of the transistor Qt1, and bias is supplied from the connection node between the resistor Rd1 and the resistor Rd2 to the middle point between the gate-gate in the transistor Qt1.

Similarly, the resistors Rd3, Rd4 are connected in series between the one end and the other end of the source/drain of the transistor Qt2, and bias is supplied from the connection node between the resistor Rd3 and the resistor Rd4 to the middle point between the gate-gate in the transistor Qt2.

In the transistor Qt5, one end of the source/drain is connected to the antenna terminal ANT, and one end of the source/drain of the transistor Qt6 is connected to the terminal TERM. The other end of the transistor Qt5 and the other end of the transistor Qt6 are commonly connected.

Connecting units on one side of the resistors Rg5 to Rg7 are connected to the respective gates of the transistor Qt5. One connecting unit of the resistor Rg6 is connected to the other connecting unit of the resistor Rg5, and one connecting unit of the resistor Rg7 is connected to the other connecting unit of the resistor Rg6. In addition, the control terminal TERMC is connected to the other connecting unit of the resistor Rg7.

Moreover, one connecting unit of the resistors Rg8 to Rg10 is each connected to the respective gates of the transistor Qt6. One connecting unit of the resistor Rg9 is connected to the other connecting unit of the resistor Rg10, and one connecting unit of the resistor Rg8 is connected to the other connecting unit of the resistor Rg9. In addition, the control terminal TERMC is connected to the other connecting unit of the resistor Rg8.

The resistors Rd5, Rd6, Rd7 are connected in series between the one end and the other end of the source/drain of the transistor Qt5, and bias is supplied from the connection node between the resistor Rd5 and the resistor Rd6 and the connection node between the resistor Rd6 and the resistor Rd7 to the middle point between the gate-gate in the transistor Qt5.

Similarly, the resistors Rd8, Rd9, Rd10 are connected in series between the one end and the other end of the source/drain of the transistor Qt6, and bias is supplied from the connection node between the resistor Rd8 and the resistor Rd9 and the connection node between the resistor Rd9 and the resistor Rd10 to the middle point between the gate-gate in the transistor Qt6.

Moreover, in the transistor Qt7, the electrostatic capacitance element C3, the resistors Rg11 to Rg13, and the resistors Rd11 to Rd13 are respectively connected, and in the transistor Qt8, the electrostatic capacitance element C4, the resistors Rg14 to Rg16, and the resistors Rd14 to Rd16 are respectively connected.

Since the connection configuration of these components is the same as the transistors Qt5, Qt6 other than that the electrostatic capacitance element C4 and the resistor Rd16 are connected to the reception terminal RX, and the resistor Rg14 and the resistor Rg11 are connected to the control terminal RXC, the explanation thereof is omitted.

Similarly, in the transistor Qt9, the electrostatic capacitance element C5, the resistors Rg17 to Rg19, and the resistors Rd17 to Rd19 are respectively connected, and the resistors Rg20 to Rg22 and the resistors Rd20 to Rd22 are respectively connected to the transistor Qt10.

Moreover, the transmission terminal TX is connected to each of the connecting units on the other side of the resistors Rg19, Rg20 via the booster circuit BS, and, similarly, one connecting unit of the resistor Rd22 and one connecting unit of the electrostatic capacitance element C6 are connected to the transmission terminal TX. In addition, each of the connecting units on the other side of the resistors Rg19, Rg20 is connected to the control terminal TXC.

When power is input to the transmission terminal TX during the transmission operation based on GSM, the gate voltage of the transistors Qt9, Qt10 will rise due to the bias voltage supplied by the booster circuit BS.

As described above, as a result of configuring the transistors based on multi-stage connection, the radio frequency voltage that is applied per stage can be lowered, and the higher-order harmonic distortion can be reduced.

The ON/OFF of the transistors Qt1, Qt2 is controlled by the control terminal TRXC connected to the gates of the transistors Qt1, Qt2. A control signal VTRXC (FIG. 3) output from the control logic output unit 20a (FIG. 1) is applied to the control terminal TRXC. The transistors Qt1, Qt2 are turned ON upon performing transmission/reception based on W-CDMA (900 MHz band).

The ON/OFF of the transistors Qt7, Qt8 is controlled by the control terminal RXC connected to the gates of the transistors Qt7, Qt8. A control signal output from the control logic output unit 20a (FIG. 1) is applied to the control terminal RXC. The transistors Qt7, Qt8 are turned ON upon performing reception based on GSM (850 MHz band, 900 MHz band).

In addition, the ON/OFF of the transistors Qt9, Qt10 is controlled by the control terminal TXC connected to the gates of the transistors Qt9, Qt10. A control signal output from the control logic output unit 20a (FIG. 1) is applied to the control terminal TXC. The transistors Qt9, Qt10 are turned ON upon performing transmission based on GSM (850 MHz band, 900 MHz band).

Moreover, the control terminal VSW is a terminal that supplies a DC voltage of the antenna potential (VANT), and is connected to the reception terminal RX via the resistor Rs. The voltage (signal VVSW of FIG. 3) supplied to the control terminal VSW is output from the control voltage generation circuit 28 (FIG. 3) provided to the control logic output unit 20a (FIG. 1).

The voltage (signal VVSW of FIG. 3) supplied to the control terminal VSW is supplied to the antenna terminal ANT via the resistor Rs and the resistors Rd16, Rd15, Rd14, Rd13, Rd12, Rd11.

<Configuration Example of Control Voltage Generation Circuit>

Figure 3:
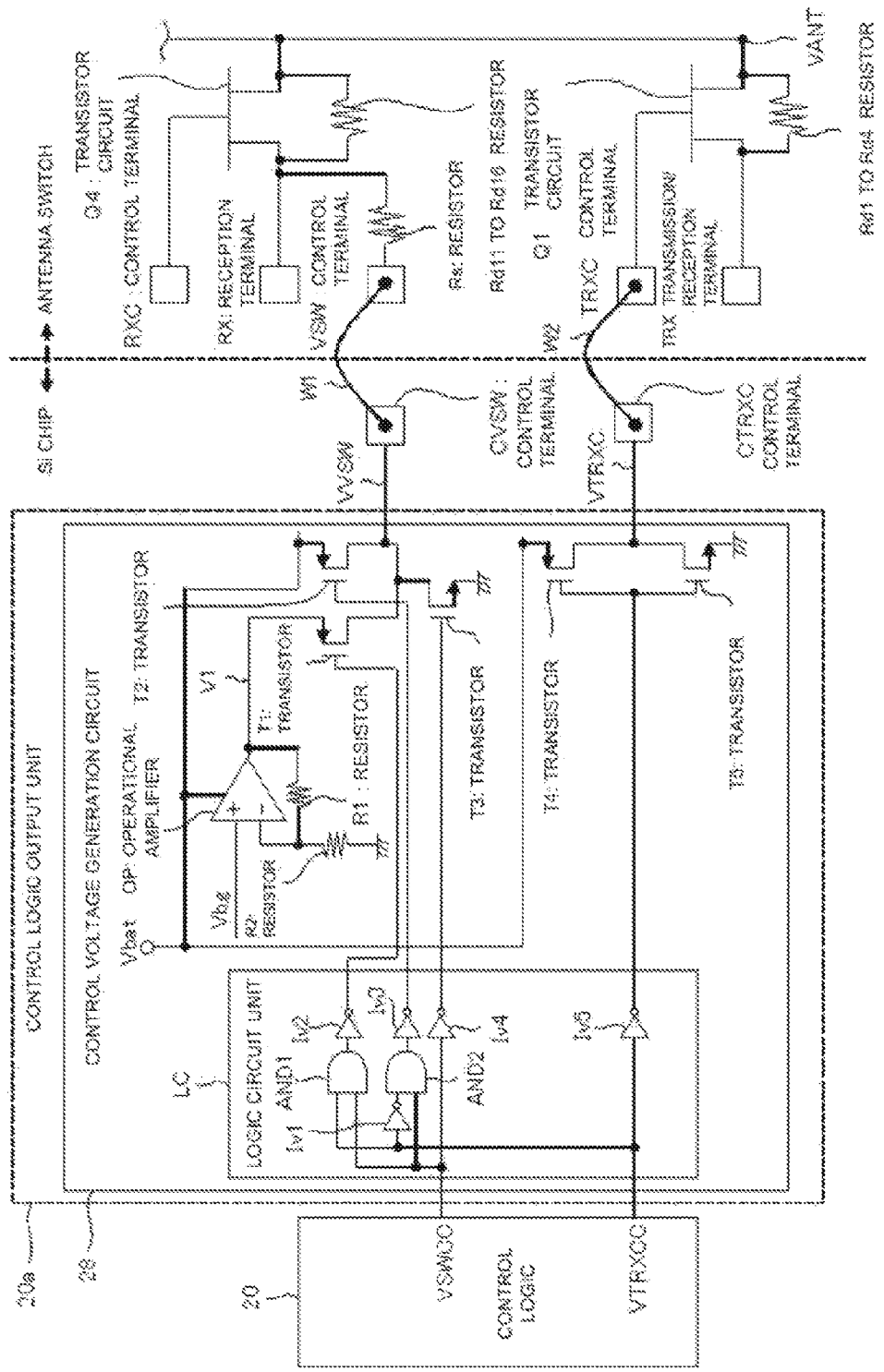
FIG. 3 is a circuit diagram showing an example of the control voltage generation circuit provided to the control logic output unit of the mobile phone depicted in FIG. 1.

FIG. 3 is a circuit diagram showing an example of the control voltage generation circuit 28 provided to the control logic output unit 20a.

The control voltage generation circuit 28 is a circuit that generates the control signal VTRXC and the signal VVSW based on the control signals (control signal VSWCC, control signal VTRXCC) output from the control logic 20. The control voltage generation circuit 28 is configured, as shown in the diagram, from a logic circuit unit LC, an operational amplifier OP, transistors T1 to T5, and resistors R1, R2.

The logic circuit unit LC is configured from inverters Iv1 to Iv5, and AND circuits AND1, AND2. The control signal VSWCC output from the control logic 20 is input to one input unit of the AND circuit AND1, one input unit of the AND circuit AND2, and an input unit of the inverter Iv4.

Moreover, the control signal VTRXCC output from the control logic 20 is input to an input unit of the inverter Iv1, an input unit of the inverter Iv5, and the other input unit of the AND circuit AND1.

The other input unit of the AND circuit AND2 is connected to an output unit of the inverter Iv1. An input unit of the inverter Iv2 is connected to an output unit of the AND circuit AND1, and an input unit of the inverter Iv3 is connected to an output unit of the AND circuit AND2.

The transistor T4 configured from a P-channel Metal Oxide Semiconductor (MOS) and the transistor T5 configured from an N-channel MOS are of an inverter configuration, and provided as the power source thereof is, for example, a power source Vbat having a rated voltage of roughly 3.6 V. The power source Vbat is a power source voltage that is supplied from the battery that is used for operating the mobile phone 1.

The output unit of the inverter Iv5 is connected to the input unit of the inverter configured from the transistors T4, T5, and the control signal VTRXC output from the output unit of the inverter configured from the transistors T4, T5 is supplied to the control terminal TRXC of the antenna switch circuit 25a.

The output unit of the inverter configured from the transistors T4, T5 is connected to the control terminal CTRXC, and connected to the control terminal TRXC of the antenna switch circuit 25a from the control terminal CTRXC via a wire W2.

A positive (+) side input terminal of the operational amplifier OP is connected so that a reference voltage Vbg is input therein, and one connecting unit of the resistor R1 and one connecting unit of the resistor R2 are respectively connected to a negative (−) side input terminal of the operational amplifier OP.

An output unit of the operational amplifier OP is connected to the other connecting unit of the resistor R1, and a ground (reference potential) is connected to the other connecting unit of the resistor R2. As the operation power source, a power source Vbat is supplied to the operational amplifier OP.

Moreover, one end of the source/drain of the transistor T1 configured from a P-channel MOS is connected to the output unit of the operational amplifier OP, and the output unit of the inverter Iv2 is connected to the gate of the transistor T1.

The power source Vbat is connected to one end of the source/drain of the transistor T2 configured from a P-channel MOS, and the output unit of the inverter Iv3 is connected to the gate of the transistor T2.

The other end of the source/drain of the transistor T1 and the other end of the source/drain of the transistor T2 are commonly connected to one end of the source/drain of the transistor T3 configured from an N-channel MOS, and the signal VVSW output from this node is supplied to the control terminal VSW as the bias voltage that supplies a DC voltage of the antenna potential (VANT).

This node is connected to the control terminal CVSW, and, for example, connected to the control terminal VSW of the antenna switch circuit 25a via a wire W1. By supplying this signal VVSW as an antenna potential, the transient response characteristics of the switch (transistor) in the antenna switch circuit 25a can be improved.

The control voltage generation circuit 28 improves the IMD characteristics by performing voltage control so that, during the transmission/reception operation based on W-CDMA, the voltage level of the signal VVSW supplied to the control terminal VSW becomes lower than the voltage level of the control signal VTRXC supplied to the control terminal TRXC.

<IMD Improvement in Transistor Circuit>

Figure 4:
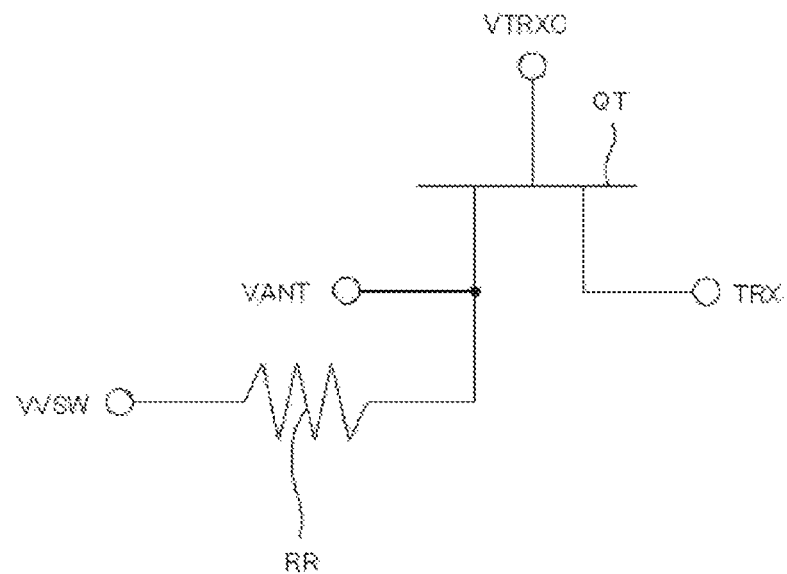
FIG. 4 is an explanatory diagram illustrating the transistor of the transistor circuit depicted in FIG. 2.
Figure 5:
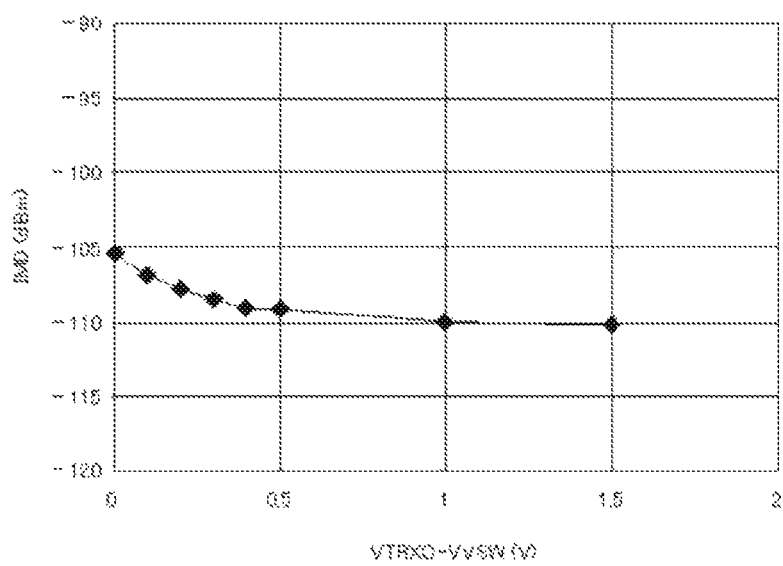
FIG. 5 is an explanatory diagram showing an example of the relative value dependency of the voltage between the gate-source/drain in the transistor circuit depicted in FIG. 4.

FIG. 4 is an explanatory diagram of the transistor QT illustrating the transistors Qt1, Qt2 of the transistor circuit Q1 depicted in FIG. 2, and FIG. 5 is an explanatory diagram showing an example of the relative value dependency of the voltage between the gate-source/drain in the transistor QT depicted in FIG. 4.

The control signal VTRXC, which is a signal for turning ON/OFF the transistor QT and output from the control voltage generation circuit 28, is input to the gate of the transistor QT as shown in FIG. 4.

Moreover, the antenna voltage VANT, and the signal VVSW output from the control voltage generation circuit 28 via the resistors RR (resistor Rs and resistor Rd11 to resistor Rd16 in FIG. 3) are respectively applied to one end of the source/drain of the transistor QT, and the transmission/reception signal that is input/output to and from the transmission/reception terminal TRX is applied to the other end of the source/drain of the transistor QT.

In FIG. 5, the horizontal axis shows the value obtained by subtracting the voltage level of the signal VVSW from the voltage level of the control signal VTRXC, and the vertical axis shows the IMD. As shown in the diagram, it can be seen that the IMD characteristics are improved as the voltage level difference between the control signal VTRXC and the signal VVSW increases.

When the gate voltage in the transistor QT is large, the voltage amplified between the drain-source decreases, and the IMD is thereby improved. In other words, when the gate voltage of the transistor QT increases, the transistor is strongly turned ON and the ON resistance decreases, the voltage amplitude between the drain-source decreases, and the IMD characteristics are thereby improved.

<Operational Example of Control Voltage Generation Circuit>

The operation of the control voltage generation circuit 28 in this embodiment 1 is now explained.

Figures 6, 7:
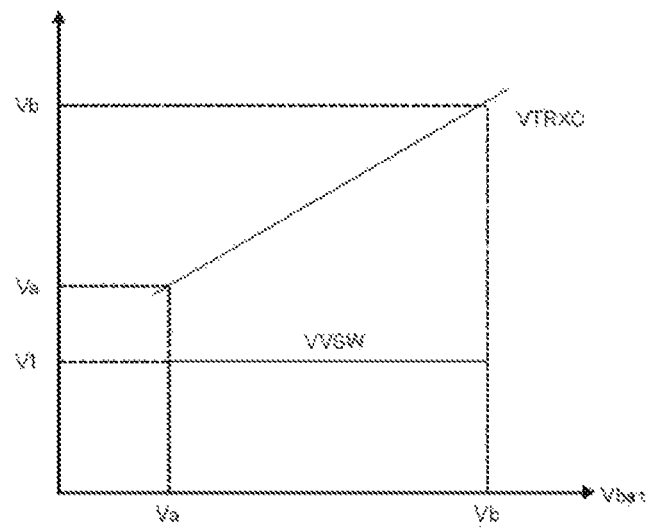
FIG. 6 is an explanatory diagram showing an example of the voltage control of the control voltage generation circuit depicted in FIG. 3.
FIG. 7 is an explanatory diagram showing the signal status of the control signal in the respective operation modes output from the control logic depicted in FIG. 1.

FIG. 6 is an explanatory diagram showing an example of the voltage control of the control voltage generation circuit 28. In FIG. 6, the horizontal axis shows the voltage level of the power source Vbat, and the vertical axis shows the voltage levels of the signal VVSW and the control signal VTRXC, respectively. In the diagram, the voltage Vb shows the upper limit voltage level (when the battery is fully charged) of the power source Vbat, and, for example, is roughly 4.25 V. The voltage Va shows the lower limit voltage level (immediately before the battery runs out of power) of the power source Vbat, and, for example, is roughly 3.1 V.

As shown in FIG. 6, the control voltage generation circuit 28 outputs the control signal VTRXC so that the voltage level thereof is dependent on the power source Vbat, and outputs the signal VVSW so that the voltage level thereof is substantially constant. Moreover, the signal VVSW has a lower voltage level than the voltage Va.

FIG. 7 is an explanatory diagram showing the signal status of the control signal VSWCC and the control signal VTRXCC output from the control logic 20 in the respective operation modes of the mobile phone 1.

Foremost, when the mobile phone 1 enters the transmission/reception operation (transmission/reception mode: TRX mode) based on W-CDMA, the control logic 20 sets both control signals VSWCC, VTRXCC to be a 'High' signal as shown in FIG. 7.

Consequently, a Lo signal is output respectively from the inverters Iv2, Iv4, Iv5 in the logic circuit unit LC, a Hi signal is output from the inverter Iv3, the transistor T1 is turned ON, and the transistors T2, T3 are respectively turned OFF.

As a result of the transistor T1 being turned ON, the voltage output from the operational amplifier OP is output as the signal VVSW to the control terminal VSW. Moreover, the voltage V1 output from the operational amplifier OP is obtained from the following formula.

$$V1 = (1 + R1/R2) \cdot Vbg \quad \text{(Formula 1)}$$

Here, the voltage V1 is set to be a voltage level that is roughly 0.3 V to 0.5 V lower than the voltage Va. Moreover, the voltage V1 output from the operational amplifier OP; that is, the voltage level of the signal VVSW can be arbitrarily changed by changing the resistance value of the resistors R1, R2, or the voltage value of the reference voltage Vbg.

Moreover, since a Lo signal is input to the inverter configured from the transistors T4, T5 as described above, the output of that inverter becomes a Hi signal, and the control signal VTRXC is output as a Hi signal.

Consequently, the transistor of the transistor circuit Q1 is turned ON. In the foregoing case, since the power source of the inverter configured from the transistors T4, T5 is the power source Vbat, the output voltage thereof is dependent on the power source Vbat.

As described above, during the transmission/reception operation (transmission/reception mode: TRX mode) based on W-CDMA, the transistor circuit Q1 is turned ON, and the signal VVSW of the voltage V1 is supplied to the antenna terminal ANT.

Subsequently, when the mobile phone 1 enters a standby state (Standby) in which neither transmission nor reception is being performed, the control logic 20 sets both control signals VSWCC, VTRXCC to be a 'Low' signal as shown in FIG. 7.

Consequently, a Hi signal is respectively output from the inverters Iv2 to Iv5 in the logic circuit unit LC, the transistor T3 is turned ON, and a Lo signal is output from the inverter configured from the transistors T4, T5. Hence, both the signal VVSW and the control signal VTRXC will be a Lo signal.

As described above, in the standby state (Standby), the transistor circuit Q1 is turned OFF, and the supply of the signal VVSW is stopped.

Next, during the transmission operation (transmission mode: TX mode) based on GSM, the control logic 20 sets the control signal VSWCC to be a 'High' signal and sets the control signal VTRXCC to be a 'Low' signal as shown in FIG. 7.

Hence, a Lo signal is respectively output from the inverters Iv3, Iv4 in the logic circuit unit LC, and a Hi signal is output from the inverters Iv2, Iv5. Hence, the transistor T2 is turned ON, and the transistors T1, T3 are respectively turned OFF.

As a result of the transistor T2 being turned ON, the power source Vbat is output as the signal VVSW to the control terminal VSW. Moreover, since a Hi signal is input to the inverter configured from the transistors T4, T5 as described above, the output of that inverter becomes a Lo signal, and the control signal VTRXC becomes a Lo signal.

As described above, during the transmission operation (transmission mode: TX mode) based on GSM, the transistor circuit Q1 is turned OFF on the one hand, and the power source Vbat output from the control terminal VSW is supplied as a bias voltage of the antenna potential VANT to the antenna terminal ANT.

Figure 8:
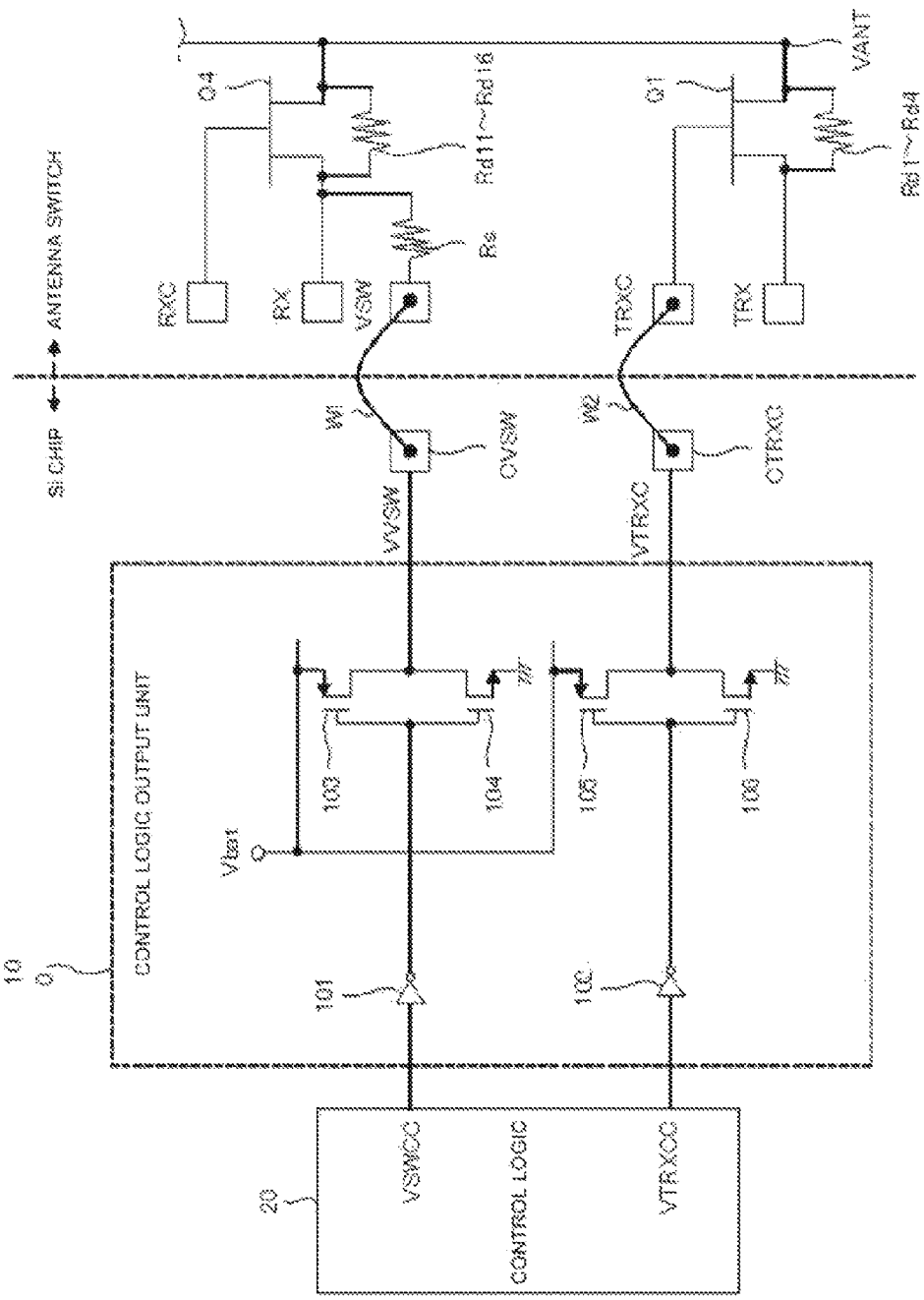
FIG. 8 is an explanatory diagram showing an example of the control logic output unit.

Generally speaking, with a control logic output unit, the voltage level of the signal VVSW and the voltage level of the control signal VTRXC are substantially the same voltage as the power source Vbat, and generated to be dependent on the power source Vbat. FIG. 8 is an explanatory diagram showing an example of the control logic output unit 100 that was considered by the present inventors.

Here, the control logic output unit 100 is configured from inverters 101, 102, and transistors 103 to 106. The control signal VSWCC output from the control logic 20 is connected to be input to an input unit of the inverter 101, and the control signal VTRXCC output from the control logic 20 is connected to be input to an input unit of the inverter 102.

An input unit of the inverter configured from the P-channel MOS transistor 103 and the N-channel MOS transistor 104 is connected to an output unit of the inverter 101, and an input unit of the inverter configured from the P-channel MOS transistor 105 and the N-channel MOS transistor 106 is connected to an output unit of the inverter 102.

In addition, the power source Vbat is supplied as the operation power source to the inverter configured from the transistors 103, 104, and the inverter configured from the transistors 105, 106.

Figure 9:
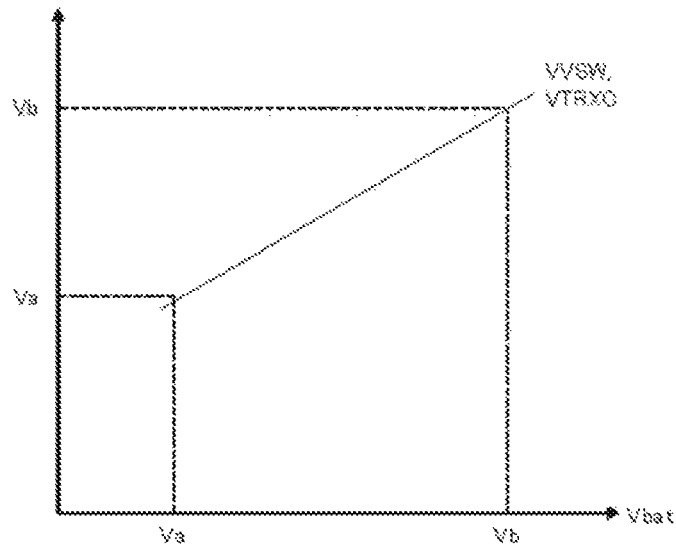
FIG. 9 is an explanatory diagram showing an example of the voltage control of the logic control output unit depicted in FIG. 8.

Hence, during the transmission/reception operation (transmission/reception mode: TRX mode) based on W-CDMA, one of the two inverters is turned ON, and, as shown in FIG. 9, the signal VVSW having a voltage level that is substantially the same as the power source Vbat is supplied to the antenna terminal ANT, and the control signal VTRXC having a voltage level that is substantially the same as the power source Vbat is supplied to the control terminal CTRXC.

When the signal VVSW and the control signal VTRXC are substantially the same, the gate voltage of the transistor in the transistor circuit Q1 will decrease, the voltage amplitude between the drain-source of that transistor will contrarily increase, and thereby deteriorate the IMD characteristics.

Meanwhile, in this embodiment, during the transmission/reception operation (transmission/reception mode: TRX mode) based on W-CDMA, the control voltage generation circuit 28 generates the signal VVSW having a voltage level that is lower than the voltage Va as the lower limit voltage value of the power source Vbat in order to increase the voltage level difference between the control signal VTRXC and the signal VVSW, decrease the ON resistance of the transistors Qt1, Qt2, and thereby improve the IMD characteristics.

Moreover, since the control voltage generation circuit 28 is configured from a simple circuit, it is possible to downsize the circuit, and thereby reduce the electric power consumption of the control voltage generation circuit 28.

Consequently, according to this embodiment 1, it is possible to improve the IMD characteristics in the antenna switch circuit 25a during the transmission/reception operation based on W-CDMA, and considerably improve the receiver performance in the mobile phone 1.

Note that, while the operation of the antenna switch circuit 25a was explained above, similar signal control as the antenna switch circuit 25a is also performed in the transistor circuit that conducts the transmission/reception terminal TRX1 and the antenna terminal ANT1 in a W-CDMA system using the 1900 MHz band.

(Embodiment 2)

In this embodiment 2, voltage control technology that differs from the control voltage generation circuit 28 of embodiment 1 is explained. With the control voltage generation circuit 28 of embodiment 1, the control signal VTRXC was generated to have a voltage level that is substantially the same as the power source Vbat, and the signal VVSW was generated to have a voltage level that is lower than the voltage Va as the lower limit voltage value of the power source Vbat. Meanwhile, with the control voltage generation circuit 28a in embodiment 2, while the control signal VTRXC is generated to have a voltage level that is substantially the same as the power source Vbat, the signal VVSW is generated to have a voltage level that is lower by a certain voltage difference relative to the control signal VTRXC (power source Vbat).

<Voltage Control Example of Control Voltage Generation Circuit>

Figure 10:
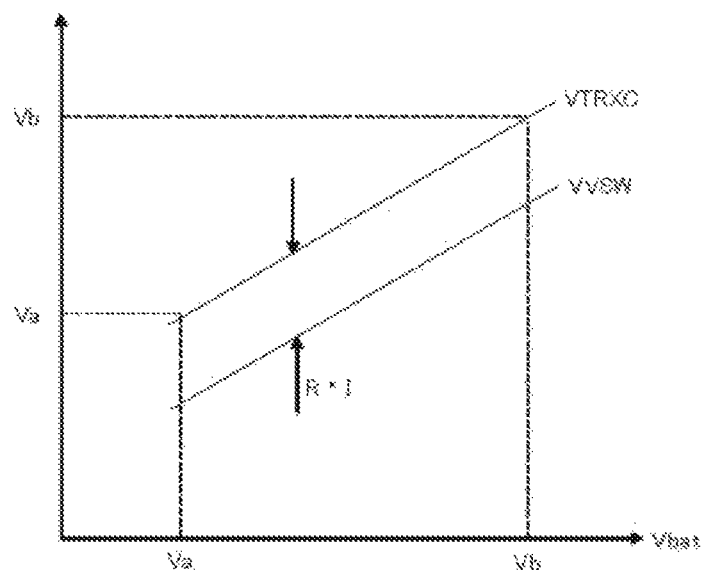
FIG. 10 is an explanatory diagram showing an example of the voltage control of the control voltage generation circuit according to embodiment 2 of the present invention.

FIG. 10 is an explanatory diagram showing an example of the voltage control of the control voltage generation circuit 28a. In FIG. 10, the horizontal axis shows the voltage level of the power source Vbat, and the vertical axis shows the voltage levels of the signal VVSW and the control signal VTRXC, respectively. In the diagram, the voltage Vb shows the upper limit voltage level (when the battery is fully charged) of the power source Vbat, and the voltage Va shows the lower limit voltage level (immediately before the battery runs out of power) of the power source Vbat.

As described above, the control signal VTRXC is output at a voltage level that is substantially the same as the power source Vbat. The signal VVSW is generated, as shown in the diagram, to have a certain voltage difference that is lower than the control signal VTRXC.

The voltage difference between the signal VVSW and the control signal VTRXC is for example, roughly 0.3 V to roughly 0.5 V, and the signal VVSW is of a voltage level that is roughly 0.3 V to roughly 0.5 V lower than the control signal VTRXC even when the control signal VTRXC is within any voltage range of voltage Va to Vb.

<Configuration Example of Control Voltage Generation Circuit>

Figure 11:
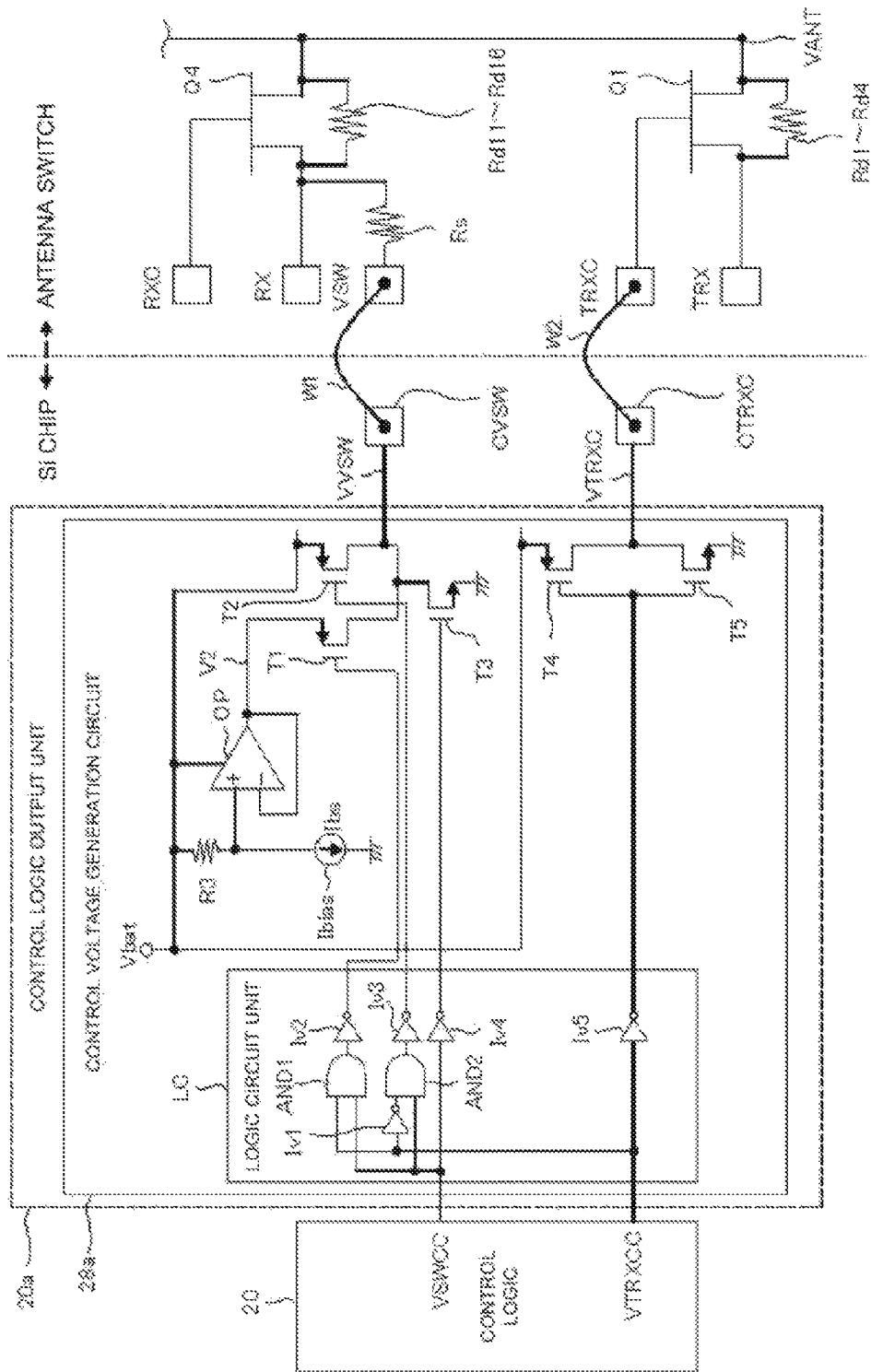
FIG. 11 is a circuit diagram showing an example of the configuration in the control voltage generation circuit depicted in FIG. 10.

FIG. 11 is a circuit diagram showing an example of the configuration in the control voltage generation circuit 28a.

The control voltage generation circuit 28a is configured, as shown in the diagram, by comprising a resistor R3 and a bias current circuit Ibias that generates a bias current Ibs in addition to the same configuration of the control voltage generation circuit 28 (FIG. 3) comprising a logic circuit unit LC, an operational amplifier OP, transistors T1 to T5, and resistors R1, R2.

The power source Vbat is connected to one connecting unit of the resistor R3 so as to supply the power source Vbat thereto, and the positive (+) side input terminal of the operational amplifier OP and the bias current circuit Ibias are respectively connected to the other connecting unit of the resistor R3. In addition, the output unit of the operational amplifier OP is connected to the negative (−) side input terminal of the operational amplifier OP.

Since the remaining connection configuration is the same as the control voltage generation circuit 28 (FIG. 3) of embodiment 1, the explanation thereof is omitted. Moreover, the signal status of the control signal VSWCC and the control signal VTRXCC output from the control logic 20 in the respective operation modes (for instance, TRX mode, Standby, TX mode) of the mobile phone 1 is the same as FIG. 7.

<Operational Example of Control Voltage Generation Circuit>

When the mobile phone 1 enters the transmission/reception operation (transmission/reception mode: TRX mode) based on W-CDMA, the transistor T1 is turned ON, and the voltage output from the operational amplifier OP is output as the signal VVSW.

Here, the voltage V2 output from the operational amplifier OP is obtained from the following formula.

$$V2 = Vbat - R \cdot Ibs \qquad \text{(Formula 2)}$$

The resistance value R of the resistor R2 and the bias current Ibs are set so that the voltage V2 becomes a voltage level (offset voltage) that is lower than the voltage Va by roughly 0.3 V to 0.5 V. Here, the offset voltage can be arbitrarily changed by changing the resistance value of the resistor R3 or the bias current Ibs generated by the bias current circuit Ibias.

When the mobile phone 1 enters a standby state (Standby) in which neither transmission nor reception is being performed, the transistor T3 is turned ON, a Lo signal is output from the inverter configured from the transistors T4, T5, and both the signal VVSW and the control signal VTRXC become a Lo signal.

In addition, during the transmission operation (transmission mode: TX mode) based on GSM, the transistor T2 is turned ON, the transistors T1, T3 are respectively turned OFF, and the power source Vbat is output as the signal VVSW. Moreover, since the inverter configured from the transistors T4, T5 will be a Lo signal output, the control signal VTRXC becomes a Lo signal.

As described above, the control voltage generation circuit 28a generates the signal VVSW to have a certain voltage difference that is substantially constant relative to the control signal VTRXC during the transmission/reception operation (transmission/reception mode: TRX mode) based on W-CDMA regardless of the voltage level of the power source Vbat.

When the voltage difference between the signal VVSW and the control signal VTRXC increases, while there is a possibility that the current will flow toward the control voltage generation circuit 28a via the parasitic diode in the transistor of the transistor circuit Q1 and the resistors Rd11 to Rd16, Rs, the foregoing flow of current can be prevented by controlling the voltage difference between the signal VVSW and the control signal VTRXC to be substantially constant.

Consequently, in this embodiment 2 also, it is possible to reduce the ON resistance of the transistors Qt1, Qt2 and thereby improve the IMD characteristics. Moreover, as a result of the IMD characteristics being improved, the receiver sensitivity of the mobile phone 1 can also be improved.

(Embodiment 3)
<Voltage Control Example of Control Voltage Generation Circuit>

Figure 12:
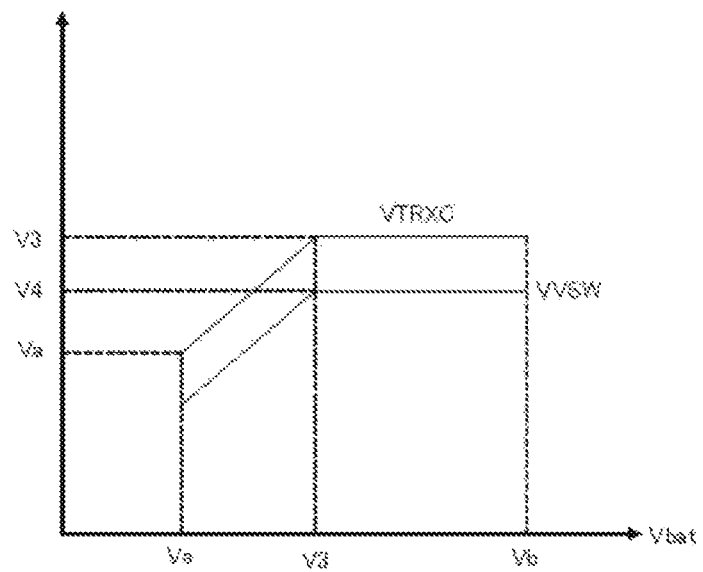
FIG. 12 is an explanatory diagram showing an example of the voltage control of the control voltage generation circuit according to embodiment 3 of the present invention.

In this embodiment 3, voltage control technology that differs from the control voltage generation circuit of embodiments 1 and 2 is explained. Here, as shown in FIG. 12, the control voltage generation circuit 28b generates a voltage level having a certain constant voltage level when the battery voltage is in a range between the voltage Vb and the voltage V3, and generates a voltage in which the control signal VTRXC becomes a voltage level that is substantially the same as the power source Vbat and the signal VVSW becomes a voltage level that is lower by a certain voltage difference relative to the control signal VTRXC (power source Vbat) when the battery voltage is in a range between the voltage V3 and the voltage Va.

Here, the voltage Vb (upper limit voltage of battery) of the power source Vbat is, for example, roughly 4.25 V, and the voltage Va (lower limit voltage of battery) of the power source Vbat is, for example, roughly 3.1 V. Moreover, the voltage V3 of the power source Vbat is, for example, roughly 3.5 V, and the voltage V4 of the signal VVSW when the power source Vbat is voltage V3 is, for example, roughly 3.1 V.

When the voltage level of the power source Vbat is greater than the voltage V3 (roughly 3.5 V), the control voltage generation circuit 28b generates the signal VVSW to be substantially constant at roughly 3.1 V, and generates the control signal VTRXC so that the voltage level is substantially constant at roughly 3.5 V.

Moreover, when the voltage level of the power source Vbat is smaller than the voltage V3 (roughly 3.5 V), the voltage level of the control signal VTRXC becomes substantially the same as the voltage level of the power source Vbat (VTRXC=Vbat).

In addition, the voltage level of the signal VVSW is generated to be smaller than the voltage level of the control signal VTRXC. The voltage difference (offset voltage) between the signal VVSW and the control signal VTRXC is output to become a voltage difference that is smaller than roughly 0.4 V, which is the voltage difference when the voltage level of the power source Vbat is greater than the voltage V3, and the voltage difference (offset voltage) gradually decreases as the voltage level of the power source Vbat approaches the voltage Va.

For example, when the power source Vbat is the voltage V3 (roughly 3.5 V), the voltage level of the signal VVSW is roughly 3.1 V, and the offset voltage is roughly 0.4 V, but when the power source Vbat is the voltage Va (roughly 3.1 V), the voltage level of the signal VVSW is roughly 2.76 V, and the offset voltage is roughly 0.34 V.

As described above, when the voltage level of the power source Vbat is greater than the voltage V3, the IMD characteristics can be improved by increasing the offset voltage of the control signal VTRXC and the signal VVSW.

Moreover, when the voltage level of the power source Vbat falls below the voltage V3, the offset voltage of the control signal VTRXC and the signal VVSW will decrease, and the circuit operation of the control voltage generation circuit 28b can thereby be stabilized.

For example, if the voltage level of the voltage Va in the power source Vbat is low (voltage Va=roughly 2.9 V), the signal VVSW requires an output of the voltage Va−0.4 V when the offset voltage is roughly 0.4 V, but there is a possibility of exceeding the range of circuit operation with the foregoing voltage, and it may not be possible to stabilize the circuit operation.

<Configuration Example of Control Voltage Generation Circuit>

Figure 13:
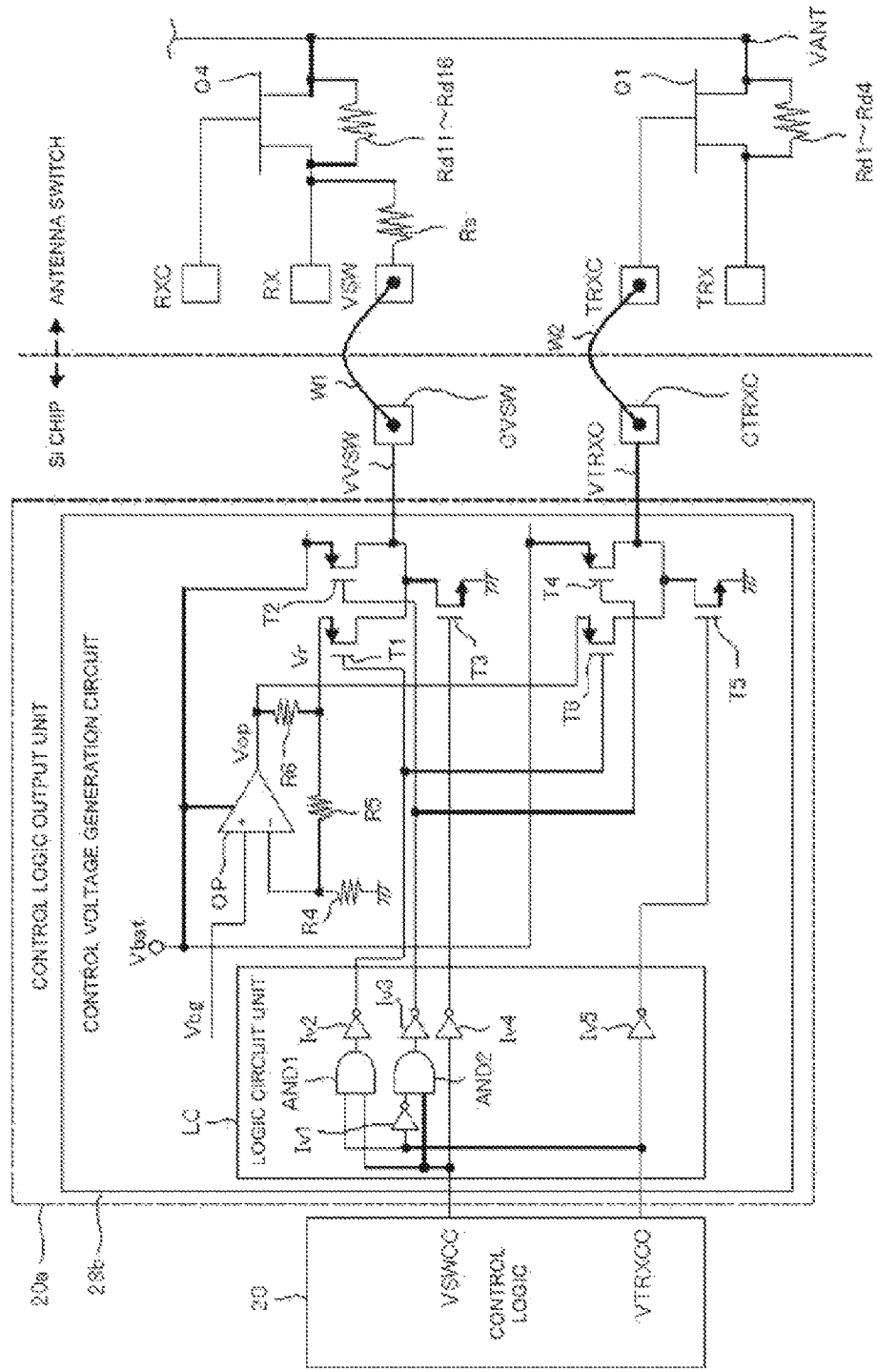
FIG. 13 is a circuit diagram showing an example of the configuration in the control voltage generation circuit depicted in FIG. 12.

FIG. 13 is a circuit diagram showing an example of the configuration in the control voltage generation circuit 28b.

The control voltage generation circuit 28b is configured, as shown in the diagram, by comprising resistors R4 to R6 and a P-channel MOS transistor T6 in addition to the same configuration of the control voltage generation circuit 28 (FIG. 3) comprising a logic circuit unit LC, an operational amplifier OP, transistors T1 to T5, and resistors R1, R2.

One connecting unit of the resistor R4 and one connecting unit of the resistor R5 are respectively connected to the negative (−) side input terminal of the operational amplifier OP, and a ground is connected to the other connecting unit of the resistor R4.

One end of the source/drain of the transistor T1 and one connecting unit of the resistor R6 are respectively connected to the other connecting unit of the resistor R5. Moreover, the other connecting unit of the resistor R6 is connected to the output unit of the operational amplifier OP.

In addition, one end of the source/drain of the transistor T6 is connected to the output unit of the operational amplifier OP, and connection node to which the transistor T4 and the transistor T5 are connected is connected to the other end of the source/drain of the transistor T6.

The output unit of the inverter Iv2 is connected to the gate of the transistor T6, and the output unit of the inverter Iv3 is connected to the gate of the transistor T4.

Since the remaining connection configuration is the same as the control voltage generation circuit 28 (FIG. 3) of embodiment 1, the explanation thereof is omitted. Moreover, the signal status of the control signal VSWCC and the control signal VTRXCC output from the control logic 20 in the respective operation modes (for instance, TRX mode, Standby, TX mode) of the mobile phone 1 is the same as FIG. 7.

<Operational Example of Control Voltage Generation Circuit>

When the mobile phone 1 enters the transmission/reception operation (transmission/reception mode: TRX mode) based on W-CDMA, the transistors T1, T6 are turned ON, and the transistors T2 to T5 are turned OFF. Hence, the voltage output from the operational amplifier OP is output as the control signal VTRXC via the transistor T6. Moreover, the voltage obtained by the resistor R6 and the resistors R5, R4 dividing the output voltage from the operational amplifier OP is output as the signal VVSW via the transistor T1.

Here, the voltage Vop output from the operational amplifier OP is obtained from the following formula.

$$Vop = (1+(R6+R5)/R4) \cdot Vbg \quad \text{(Formula 3)}$$

The divided voltage Vr based on the resistor R6 and the resistors R5, R4 is obtained from the following formula.

$$Vr = (1+((R6+R5)/R4)) \cdot Vbg \cdot ((R5+R4)/(R6+R5+R4)) \quad \text{(Formula 4)}$$

Here, the voltage Vop output from the operational amplifier OP will be roughly 3.5 V when the voltage level of the power source Vbat is higher than the voltage V3, and the signal VVSW (divided voltage based on resistors R6 to R4) will be roughly 3.1 V. Hence, the resistance values of the resistors R6 to R4 are set so that the divided voltage is roughly 3.1 V.

Moreover, the voltage level of the control signal VTRXC (voltage Vop) can be arbitrarily changed by changing the reference voltage Vbg, and the signal VVSW can be arbitrarily changed by changing the resistance values of the resistors R6 to R4.

The foregoing operations are performed when the voltage level of the power source Vbat is higher than the voltage V3. When the voltage level of the power source Vbat falls below the voltage V3, the voltage (control signal VTRXC) output from the operational amplifier OP will be a voltage that is substantially the same as the power source Vbat (Vop=Vbat−Vds (Vds is the voltage between the drain-source in the output-stage transistor of the operational amplifier OP)).

The voltage level of the signal VVSW is obtained from the following formula.

$$VVSW = (R5+R4)/(R6+R5+R4) \cdot Vbat \quad \text{(Formula 5)}$$

Hence, as the voltage level of the power source Vbat approaches the voltage Va from the voltage V3, the voltage difference (offset voltage) between the signal VVSW and the control signal VTRXC gradually decreases.

Subsequently, when the mobile phone 1 enters a standby state (Standby) in which neither transmission nor reception is being performed, the transistors T3, T5 are turned ON, and both the signal VVSW and the control signal VTRXC become a Lo signal.

In addition, during the transmission operation (transmission mode: TX mode) based on GSM, the transistors T2, T5 are turned ON, the control signal VTRXC becomes a Lo signal, and the signal VVSW becomes a voltage level that is substantially the same as the power source Vbat.

Consequently, in this embodiment 3 also, it is possible to reduce the ON resistance of the transistors Qt1, Qt2 and thereby improve the IMD characteristics. In addition, when the voltage level of the power source Vbat is lowered (voltage V3), it is possible to decrease the offset voltage and stabilize the circuit operation.

(Embodiment 4)

Figure 14:
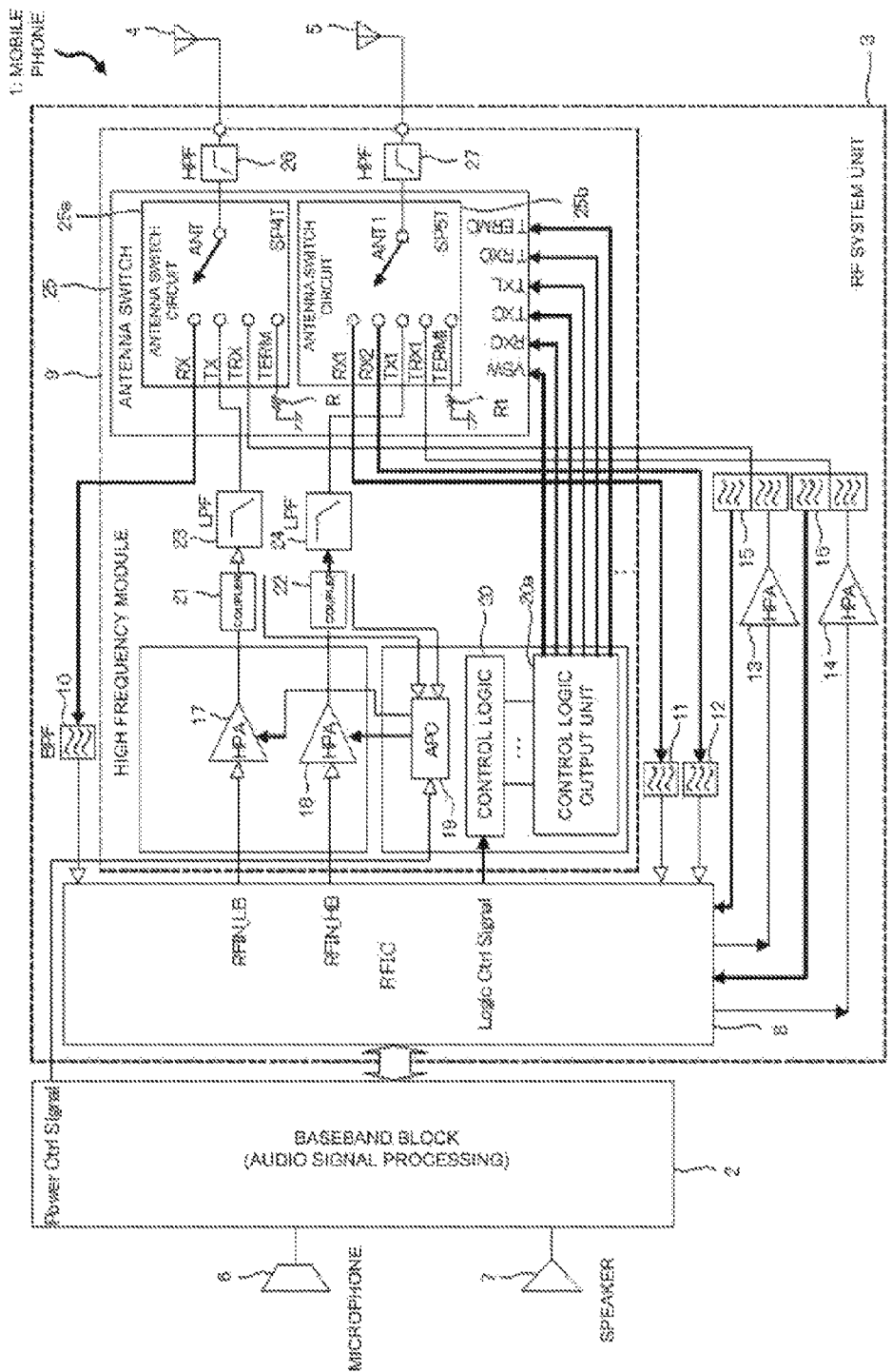
FIG. 14 is a block diagram showing an example of the configuration of the mobile phone according to embodiment 4 of the present invention.

FIG. 14 is a block diagram showing an example of the configuration of the mobile phone according to embodiment 4 of the present invention.

Embodiment 1 described a case where, in the high frequency module 9 provided to the mobile phone 1 (FIG. 1), the high-power amplifiers 17, 18, the APC 19, the control logic 20, and the control logic output unit 20a are formed on a semiconductor chip made from a Si chip. However, as shown in FIG. 14, it is also possible to adopt a configuration of forming the APC 19, the control logic 20, and the control logic output unit 20a on a Si chip, and forming the high-power amplifiers 17, 18 on a different semiconductor chip made from an HBT (hetero bipolar transistor) chip.

In the foregoing case, as with FIG. 1 of embodiment 1, the mobile phone 1 is configured from a baseband block 2, a Radio Frequency (RF) system unit 3, antennas 4, 5, a microphone 6, and a speaker 7. The RF system unit 3 is also configured, as with FIG. 1 of embodiment 1, from an RFIC 8, a high frequency module 9, Band-Pass Filters (BPFs) 10 to 12, high-power amplifiers 13, 14, and duplexers 15, 16.

In addition, the high frequency module 9 is also configured, as with FIG. 1, from High-Power Amplifiers (HPAs) 17, 18, an Auto Power Control (ACP) circuit 19, a control logic 20, a control logic output unit 20a, couplers 21, 22, LPFs 23, 24, an antenna switch 25, and High Pass Filters (HPFs) 26, 27, and all operations are also the same as embodiment 1.

While the invention disclosed herein was specifically explained above based on certain embodiments, the present invention is not limited to the foregoing embodiments, and it goes without saying that the present invention may be variously modified while remaining within the scope of the invention.

The present invention can be suitably applied to a high frequency module for mobile phones.

REFERENCE LIST

1 Mobile phone
2 Baseband block
3 RF system unit
4 Antenna
5 Antenna
6 Microphone
7 Speaker
8 RFIC
9 High frequency module
10 Band-pass filter
11 Band-pass filter
12 Band-pass filter
13 High-power amplifier
14 High-power amplifier
15 Duplexer
16 Duplexer
17 High-power amplifier
18 High-power amplifier
19 APC
20 Control logic
20a Control logic output unit
21 Coupler
22 Coupler
23 LPF
24 LPF
25 Antenna switch
25a Antenna switch circuit
25b Antenna switch circuit
26 HPF
27 HPF
28 Control voltage generation circuit
28a Control voltage generation circuit
28b Control voltage generation circuit
ANT Antenna terminal
ANT1 Antenna terminal
RX Reception terminal
RX1 Reception terminal
RX2 Reception terminal
TX Transmission terminal
TX1 Transmission terminal
TRX Transmission/reception terminal
TRX1 Transmission/reception terminal
TERM Terminal
TERM1 Terminal
TRXC Control terminal
RXC Control terminal VSW Control terminal
CVSW Control terminal
CVTRXC Control terminal
R Resistor
R1 Resistor
Qt1 Transistor
Qt2 Transistor
Qt3 Transistor
Qt4 Transistor
Qt5 Transistor
Qt6 Transistor
Qt7 Transistor
Qt8 Transistor
Qt9 Transistor
Qt10 Transistor
Qt11 Transistor
Q1 Transistor circuit
Q2 Transistor circuit
Q3 Transistor circuit
Q4 Transistor circuit
Q5 Transistor circuit
BS Booster circuit
Rg1 to Rg20 Resistor
Rd1 to Rd22 Resistor
Rs Resistor
C1 Electrostatic capacitance element
C2 Electrostatic capacitance element
C3 Electrostatic capacitance element
C4 Electrostatic capacitance element
C5 Electrostatic capacitance element
C6 Electrostatic capacitance element
LC Logic circuit unit
OP Operational amplifier
Iv1 to Iv5 Inverter
AND1 AND Circuit
AND2 AND Circuit
T1 to T6 Transistor
W1 Wire
W2 Wire
R1 Resistor
R2 Resistor
R3 Resistor
R4 Resistor
R5 Resistor
R6 Resistor
QT Transistor
RR Resistor
Ibias Bias current circuit
100 Control logic output unit
101 Inverter
102 Inverter
103 Transistor
104 Transistor
105 Transistor
106 Transistor

What is claimed is:

1. An antenna switch including:
an antenna terminal connected to an antenna,
a plurality of signal terminals corresponding to a plurality of communication systems,
a control terminal configured to supply, to the antenna terminal, a first control signal as a direct current voltage of an antenna potential,
a transmission/reception transistor circuit configured to switch connection or non-connection between a transmission/reception signal terminal among the plurality of signal terminals and the antenna terminal, a transmission/reception signal being input/output to and from the transmission/reception signal terminal,
a transmission transistor circuit configured to switch connection or non-connection between a transmission signal terminal among the plurality of signal terminals and the antenna terminal, a transmission signal being input to the transmission signal terminal, and configured to switch connection or non-connection between the plurality of signal terminals and the antenna terminal, respectively,
wherein the transmission/reception signal terminal is connected to one end of a source/drain of the transmission/reception transistor circuit, and the antenna terminal is connected to another end of the source/drain of the transmission/reception transistor circuit,
the control terminal is connected to the antenna terminal via at least one resistor element provided between source and drain of the transmission transistor circuit, and
a second control signal for turning ON the transmission/reception transistor circuit is provided to a gate of the transmission/reception transistor circuit, and a voltage level of the second control signal is a voltage level that is higher than that of the first control signal.

2. The antenna switch according to claim 1, further comprising
a transmission/reception transistor circuit used for communication based on a W-CDMA system using a low frequency band among the plurality of communication systems, and
a transmission/reception transistor circuit used for communication based on a W-CDMA system using a frequency band that is higher than the low frequency band among the plurality of communication systems.

3. The antenna switch according to claim 1, wherein a voltage generation circuit is configured to generate the first control signal and the second control signal, based on a control signal output from a logic unit configured to activate the antenna switch.

4. The antenna switch according to claim 3, wherein the voltage generation circuit includes:
an operational amplifier in which a battery voltage of a battery is supplied as an operation power source, a reference voltage is input to a positive-side input terminal, a divided voltage obtained by a resistor dividing an output signal output from an output unit is input to a negative-side input terminal, and the output signal output from the output unit is output as the first control signal;
an output switching circuit configured to output, as the first control signal, a signal generated by the operational amplifier upon turning ON the transmission/reception transistor circuit, and switch the output so that the battery voltage of the battery is output to the transmission signal terminal upon turning ON the transmission transistor circuit; and
the output unit configured to output the battery voltage of the battery as the second control signal upon turning ON the transmission/reception transistor circuit.

5. The antenna switch according to claim 3, wherein the voltage generation circuit includes:
a bias current circuit configured to generate a bias current;
a resistor configured to convert a current generated by the bias current circuit into a voltage;
an operational amplifier in which a battery voltage of the battery is supplied to one connection, a voltage generated by the resistor is input to a positive-side input terminal, an output unit is connected to a negative-side input terminal, and an output signal output from an output unit is output as the first control signal;

an output switching circuit configured to output, as the first control signal, a signal generated by the operational amplifier upon turning ON the transmission/reception transistor circuit based on a control signal output from the logic unit, and implements switching so that the battery voltage of the battery is output as the first control signal upon turning ON the transmission transistor circuit; and the output unit configured to output the battery voltage of the battery as the second control signal upon turning ON the transmission/reception transistor circuit.

* * * * *